Patented May 24, 1938

2,118,033

UNITED STATES PATENT OFFICE 2,118,033

ARYL MERCURY SALTS OF ALIPHATIC POLYCARBOXYLIC ACIDS

Carl N. Andersen, Wellesley Hills, Mass., assignor to Lever Brothers Company, a corporation of Maine No Drawing. Application September 12, 1936, Serial No. 100,467

11 Claims. (Cl. 260—13)

The present invention relates to the production of certain new aryl mercury salts of polybasic aliphatic carboxylic acids.

It is an object of my invention to produce new organic mercury compounds useful as germicides and for other therapeutic purposes.

I have discovered that when one or more of the acidic hydrogen atoms of a polybasic acid of the aliphatic type are replaced by the essential radical of certain aromatic mercury compounds, compounds are produced which have extraordinarily high potency as antiseptics and germicides and at the same time are characterized by relatively low toxicity and other desirable properties. Organic mercury salts have been prepared from a sufficiently representative number of the polybasic acids to indicate that all of the acids of this group can be employed to produce such compounds, and that the compounds so prepared have, in greater or lesser but always in relatively high degree, desirable antiseptic and germicidal properties.

The compounds constituting the subject matter of the present invention may be described as having the general formula $(RHg)_x.R_1$ in which R represents an aromatic structure, to the carbon atom of which the mercury is directly attached; in which $R_1$ represents a polybasic aliphatic acid radical or an acid salt or ester thereof, which radical is linked to the RHg group or groups through the replacement of an acidic hydrogen atom or atoms; and in which $x$ represents a number of RHg groups attached to the acid radical. While the words "group" or "groups" are used hereinafter they must be interpreted as singular or plural depending upon the value of $x$.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as, for example, mono or polycyclic hydrocarbons in which all of the unclear carbon atoms, other than the one attached to mercury, and any side chain carbon atoms, have their valences satisfied either by carbon or hydrogen. Examples are the diphenyl, tolyl, xylyl and naphthyl groups.

The radical $R_1$ represents the radical of any polybasic aliphatic acid of any basicity, or of any salt or ester thereof in which less than all of the acidic hydrogens are replaced by a positive radical.

The method I prefer to employ is one of reacting an aromatic mercury base with the acid to produce a salt and water. This method has the advantage that the only by-product of the reaction is water and the resulting compound therefore may be readily purified.

Another method that may be employed in preparing the aromatic mercury salts is the reaction of an aromatic mercury salt of an organic acid, for example the acetate or lactate with a polybasic aliphatic acid to form an aromatic mercury salt of relatively low solubility as compared with the similar salts of the organic acid and which is also relatively insoluble as compared with the organic acid itself.

Any inert liquid may be used as the medium for carrying out the reaction, inasmuch as its only function is to bring the reacting components together in a form whereby the reaction may proceed. Water is convenient to use because of its availability; other solvents are equally as satisfactory, such as the lower alcohols, benzol, acetone or any other organic solvent or mixtures of these with each other or water.

The process may be carried out at any ordinary temperature, for example room temperature, and it is not dependent upon the use of an elevated temperature. In most cases, I find, however, that the use of heat facilitates the solution of the reacting components and permits the use of solutions of greater concentration.

In most cases the yields obtained are very good and in some instances substantially theoretical. The reacting materials are usually employed in substantially theoretical quantities. In some cases if desired, as in some of the examples, approximately 10% excess of the acid may be employed in order to insure complete conversion of the aromatic mercury compound.

One or more, including all, of the acidic hydrogens of the aliphatic polybasic acid may be replaced by an aromatic mercury radical. The number of hydrogens replaced is dependent on the amounts of the reacting components. If less than all of the acidic hydrogens are replaced the corresponding acid salts may be formed.

Mixed salts in which the acidic hydrogens are replaced by different radicals may be prepared and in the case of polybasic acids containing three or more acidic hydrogen atoms, mixed acid salts may be prepared. Mixed salts may be prepared in which different aromatic mercury radicals replace the acidic hydrogens, for example, as in Example 8. But the mixed salt may have any positive radical, in particular alkali metals such as sodium and potassium, attached to the acid radical along with the aromatic mercury radical. The mixed aromatic mercury alkali metal salts are more soluble than the acid or the neutral salts and in some instances this is advantageous. Compounds of this type may be prepared by employing the alkali metal acid salt in a reaction with the aromatic mercury compound or by employing suitable quantities of an alkali metal hydroxide or carbonate in the reaction of the aromatic mercury compound and the polybasic acid.

The compounds may be prepared in various ways and the following specific examples are given merely as illustrative of such methods of preparation and as illustrative of compounds of the generic class heretofore described as constituting my invention.

Example 1

5.88 grams of phenylmercury hydroxide is dissolved in 2 liters of water by heating to boiling. The solution is then filtered to remove any gums or other insoluble material present. To the filtrate is added an aqueous solution containing 1.30 grams of anhydrous succinic acid in 100 cc. of water. The resulting mixture is then heated to boiling and allowed to stand for 12 hours before filtering. Precipitation begins immediately. The precipitate after filtration is washed thoroughly with warm water and dried in an oven at 110° C. The resulting product is a white crystalline powder which is sparingly soluble in water. It decomposes at 221° C. This compound is the diphenylmercury salt of succinic acid.

Example 2

5.88 grams of phenylmercury hydroxide is dissolved in 2 liters of water. The solution is filtered and to the filtrate is added 1.27 grams of maleic acid in 100 cc. of water. The resulting mixture is brought to boiling and allowed to stand until precipitation is complete. The precipitate is then filtered, washed thoroughly with water and dried. The product is a white crystalline powder of low solubility in water and begins to decompose at 185° C. It is the compound diphenylmercury maleate.

Example 3

5.88 grams of phenylmercury hydroxide is dissolved in 2 liters of water. The solution is then filtered and to the filtrate is added 1.60 grams of adipic acid in 100 cc. of water. The resulting mixture is brought to boiling and allowed to stand until precipitation is complete. The precipitate is then filtered, washed thoroughly with water and dried at 110° C. The resulting product is a white crystalline powder which is sparingly soluble in water. This product melts at 207° C. and is the compound diphenylmercury adipate.

Xylylmercury adipate may similarly be prepared by suspending 155.56 grams of xylylmercury hydroxide in 4 liters of alcohol to which is added 35.04 grams of adipic acid in 200 cc. of water. The mixture is heated to speed the reaction and on cooling white shiny crystals separate which are removed by filtration and washed with alcohol. If desired the mother liquor may be concentrated to obtain a larger yield. The product is a crystalline mass having a melting point of 135° C. and is the compound dixylylmercury adipate.

Example 4

17.64 grams of phenylmercury hydroxide is dissolved in 4 liters of water. When solution of the hydroxide is complete the solution is filtered and to the filtered solution is added 6.2 grams of azelaic acid in aqueous solution. The mixture is brought to boiling and allowed to stand for 24 hours, when it is filtered, and the precipitate washed with distilled water and dried. The resulting product is a white crystalline substance sparingly soluble in water and melting at 165° C. This compound is diphenylmercury azelate.

Example 5

17.64 grams of phenylmercury hydroxide is dissolved in 4 liters of water and then filtered. To the filtered solution, 6.36 grams of sebacic acid in aqueous solution is added. Precipitation begins immediately. The solution is brought to boiling and then allowed to stand for 24 hours. The precipitate is then filtered off, washed with distilled water and dried. The resulting salt, diphenylmercury sebacate, is a white crystalline substance of low solubility in water and melting at 173° C.

Example 6

52.92 grams of phenylmercury hydroxide is dissolved in 3 liters of water and boiled to facilitate the solution. The solution is filtered to remove any gum or insoluble material. To the filtrate is added an aqueous solution containing 11.61 grams of tricarballylic acid. A white precipitate results immediately and the mixture is allowed to stand after which it is filtered and the precipitate washed well with alcohol and dried. The product melts at 212° C. with decomposition, and is the compound triphenylmercury tricarballylate.

Example 7

40.16 grams of triphenylmercury acetate is dissolved in 4 liters of water and heated to facilitate solution. The solution is filtered to remove any insoluble material. To the filtrate is added 5.9 grams of oxalic acid dissolved in 100 cc. of water. A white precipitate results and the mixture is allowed to stand after which it is filtered and the precipitate washed with water and then alcohol and dried. The product has a melting point of 150° C. with decomposition, and is the compound diphenylmercury oxalate.

Example 8

82.56 grams of naphthylmercury hydroxide is dissolved in 4 liters of alcohol. When solution is complete 92.4 grams of tolylmercury hydroxide is added and the mixture heated until solution is complete. To the solution is added 43.56 grams of pyrotartaric acid. The solution is concentrated to two-thirds of its original volume and allowed to cool. The material which precipitates is separated by filtration, washed and dried. It has a melting point of 155–156° C. and is the compound naphthylmercury tolylmercury pyrotartrate.

Phenylmercury pyrotartrate may be prepared in a manner analogous to that previously set forth by employing 88.2 grams of phenylmercury hydroxide and 43.56 grams of pyrotartaric acid.

Example 9

35.28 grams of phenylmercury hydroxide is dissolved in 500 cc. of alcohol and heated to facilitate solution. The solution is filtered directly into 100 cc. of water containing 7.8 grams of citraconic acid. A white bulky precipitate forms and the mixture is allowed to cool after which the precipitate is separated by filtration, washed with alcohol and dried. The product is recrystallized from alcohol and has a melting point of 214.5° C. with decomposition. It is the compound diphenylmercury citraconate.

Example 10

52.92 grams of phenylmercury hydroxide is dissolved in 500 cc. of alcohol and heated to facilitate solution. The solution is filtered and to the filtrate is added 10.44 grams of aconitic acid dissolved in 100 cc. of water. A white milky precipitate forms on the addition, and a white fibrous crystalline material separates on cooling. The mixture is filtered and the precipitate washed with alcohol and dried. Upon recrystallization from alcohol the product has a melting point of 145–147° C. with decomposition. It is the compound triphenylmercury aconitate.

Example 11

17.64 grams of phenylmercury hydroxide is dissolved in 800 cc. of water and heated to boiling. When solution is complete the solution is filtered and to the filtrate is added 7.08 grams of succinic acid. A thick white precipitate settles. This is agitated on a hot plate for a few moments to break up the precipitate and complete the reaction. The precipitate is filtered and washed well with boiling water. It is filtered dry on suction and recrystallized from alcohol. It has a melting point 229.5–230° C., and is the compound monophenylmercury succinate.

Example 12

17.64 grams of phenylmercury hydroxide is dissolved in 800 cc. of water and heated until solution is complete. The solution is filtered and to the filtrate is added 100 cc. of water containing 7.08 grams of succinic acid and 2.4 grams of sodium hydroxide. A white precipitate results and the mixture is agitated and heated on hot plate for 15 minutes in order to complete reaction. The mixture is filtered hot and washed with hot water on suction. The product is recrystallized from alcohol; it has a melting point of 223° C., and is the monophenylmercury monosodium succinate.

All of the compounds produced as above described are characterized by highly satisfactory antiseptic and germicidal properties. Tests to determine the efficacy of some of them in killing B. typhosus and staph. aureus were carried on under the following conditions:

Aqueous solutions of varying dilutions from 1:10,000 upward until killing ceased were made up.

These dilutions were employed in the conduct of the tests by the following methods:

Circular 198, U. S. Dept. of Agriculture, Dec. 1931, described as F. D. A. Method Against *Eberthella typhi* (typhoid bacillus) at 37° C. and F. D. A. Special Method Against *Staph. aureus* at 37° C.

The maximum dilutions at which killing in 15 minutes resulted are given below:

|  | B. Typhosus | Staph. aureus |
|---|---|---|
| Phenylmercury adipate | 1:70,000 | 1:60,000 |
| Phenylmercury sebacate | 1:35,000 | 1:10,000 |
| Phenylmercury fumarate | 1:90,000 | 1:15,000 |
| Phenylmercury pyrotartrate | 1:70,000 | 1:60,000 |

All of these compounds are characterized by relatively low toxicity. Because of this and their high potency which makes it possible to use them in extreme dilutions they may be used locally in some cases and in some cases administered internally with satisfactory results from the germicidal standpoint and without harmful effects. Many of the compounds, because of the fact that they do not sublime in soap, are further particularly suited for use in preparing soaps and similar compositions.

These new compounds may be used directly as germicides in aqueous or other solutions or may be formed into various preparations such as mouth washes, tooth pastes, soaps, etc.

Although the invention has been illustrated with particular reference to certain polybasic aliphatic acids, it is understood that the aromatic mercury salts of all acids coming within the general class are included within the scope of the invention. Other examples are salts of itaconic acid, malonic acid and dimalonic acid.

This application is a continuation in part of my application Serial No. 694,201, filed October 18, 1933.

I claim:

1. A salt of an aliphatic polybasic carboxylic acid in which at least one of the acidic hydrogens of the acid has been replaced by an aromatic mercury radical of the kind wherein the mercury is directly connected to a nuclear carbon of an aromatic structure in which none of the carbon atoms has direct linkage with any element other than hydrogen, carbon or mercury; and in which the mercury of said aromatic mercury radical is directly attached to at least one of the acid radicals of the polybasic carboxylic acid.

2. A new organic compound of the general formula $(RHg)_x.R_1$, in which R represents an aromatic structure to a carbon atom of which mercury is directly attached and in which none of the carbon atoms have direct linkage to any element other than hydrogen, carbon and mercury; in which $R_1$ represents a polybasic aliphatic carboxylic acid radical that is linked to the RHg group through the replacement of carboxylic hydrogen; and in which $x$ represents the number of RHg groups in the compound and is an integer of at least one and not more than the number of carboxylic hydrogens in the radical $R_1$.

3. A new organic compound of the general formula $(RHg)_x.R_1$, in which R represents an aromatic structure to a carbon atom of which mercury is directly connected and in which none of the carbon atoms has direct linkage with any element other than hydrogen, carbon and mercury; in which $R_1$ represents a polybasic aliphatic carboxylic acid radical that is linked to the RHg group through the replacement of carboxylic hydrogen; and in which $x$ represents the number of RHg groups in the compound and is an integer of at least two and not more than the number of carboxylic hydrogens in the radical $R_1$.

4. A salt of an aliphatic polybasic carboxylic acid in which at least one of the acidic hydrogens has been replaced by the phenylmercury radical.

5. A phenylmercury salt of a polybasic aliphatic carboxylic acid.

6. A phenylmercury salt of a saturated polybasic aliphatic carboxylic acid.

7. A phenylmercury salt of an unsaturated polybasic aliphatic carboxylic acid.

8. A phenylmercury salt of a di-basic aliphatic carboxylic acid.

9. A phenylmercury salt of adipic acid.

10. A phenylmercury salt of fumaric acid.

11. A phenylmercury salt of succinic acid.

CARL N. ANDERSEN.